United States Patent
Ide et al.

(10) Patent No.: US 11,327,487 B2
(45) Date of Patent: May 10, 2022

(54) AUTOMATIC DRIVING CONTROL SYSTEM

(71) Applicant: TOYOTA JIDOSHA KABUSHIKI KAISHA, Toyota (JP)

(72) Inventors: Hirohito Ide, Nagoya (JP); Yuchi Yamanouchi, Toyota (JP); Masaki Shitara, Nagakute (JP); Ryo Hattori, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 105 days.

(21) Appl. No.: 17/017,867

(22) Filed: Sep. 11, 2020

(65) Prior Publication Data

US 2021/0103279 A1 Apr. 8, 2021

(30) Foreign Application Priority Data

Oct. 4, 2019 (JP) .............................. JP2019-183638

(51) Int. Cl.
- *G05D 1/00* (2006.01)
- *B60K 35/00* (2006.01)
- *G05D 1/02* (2020.01)

(52) U.S. Cl.
CPC ........... *G05D 1/0061* (2013.01); *B60K 35/00* (2013.01); *G05D 1/0223* (2013.01); *B60K 2370/1438* (2019.05)

(58) Field of Classification Search
CPC .... G05D 1/0061; G05D 1/0223; B60K 35/00; B60K 2370/1438; B60K 2370/143; B60K 37/06; B60W 50/082; B60W 50/085; B60W 2050/146; B60W 2300/10; B60W 50/14; B60W 2540/215; B60W 2720/10; B60W 2720/106; B60W 30/143
See application file for complete search history.

(56) References Cited

U.S. PATENT DOCUMENTS

2018/0188726 A1 7/2018 Newman

FOREIGN PATENT DOCUMENTS

| EP | 3315375 A1 | 5/2018 |
|---|---|---|
| JP | 2007-112359 A | 5/2007 |
| JP | 2018-124855 A | 8/2018 |

*Primary Examiner* — Rodney A Butler
(74) *Attorney, Agent, or Firm* — Oliff PLC

(57) ABSTRACT

A touch panel of an automatic driving vehicle includes a SLOW DOWN button. An operator is able to operate the SLOW DOWN button while the vehicle is running in the automatic driving mode to apply different deceleration controls using a first operation, or a long press, and a second operation, or a short press. For example, when a long press is applied, the automatic driving vehicle completes deceleration at time t4, or a time immediately after time t3 at which the long press operation is completed. In contrast, when a short press is applied, the automatic driving vehicle completes deceleration after the elapse of a relatively long period after completion of the short press.

11 Claims, 15 Drawing Sheets

AUTOMATIC DRIVING CONTROL SYSTEM

CROSS REFERENCE TO RELATED APPLICATION

This application claims priority to Japanese Patent Application No. 2019-183638 filed on Oct. 4, 2019, which is incorporated herein by reference in its entirety including the specification, claims, drawings, and abstract.

TECHNICAL FIELD

The present disclosure relates to an automatic driving control system to be employed in an automatic driving vehicle.

BACKGROUND

Automatic driving vehicles capable of automatic driving have been known. Automatic driving means that driving control, for example, including vehicle speed control or steering control, is fully or partially executed by a computer. An automatic driving vehicle is normally adapted to a plurality of driving modes, including an automatic driving mode for automatic driving and a manual driving mode for driving control by an operator on board the automatic driving vehicle. Some automatic driving vehicles receive an input of an operation from an operator to execute control in the automatic driving mode.

JP 2018-124855A discloses that two emergency control switches are provided near a driver (corresponding to an operator) in an automatic driving vehicle. The switch positioned farther from the driver is always used for emergency control, while the switch positioned closer to the driver is displayed on a touch panel upon detection of a bad physical condition of the driver.

SUMMARY

The ability to decelerate or stop an automatic driving vehicle running in the automatic driving mode, following the intention of an operator, would enhance convenience and address various traffic conditions. The above-mentioned JP2018-124855A, however, discloses merely provision of two emergency stop buttons, and cannot meet the intention of the operator. In particular, an automatic driving vehicle without a driver's seat, a brake pedal, an acceleration pedal, a steering wheel, or the like faces the increasing need for allowing an operator to issue a plurality of instructions.

An object of this disclosure is to prepare a plurality of aspects for deceleration/acceleration control to be executed based on an instruction from an operator while an automatic driving vehicle is running in the automatic driving mode.

According to one aspect disclosed in this disclosure, there is provided an automatic driving control system including an operation input device to be manually operated by an operator while the automatic driving vehicle is running in an automatic driving mode, the operation input device being for receiving a first operation instruction or a second operation instruction; and a control device for executing a first deceleration control upon receipt of the first operation instruction from the operation input device to decelerate the automatic driving vehicle and for executing a second deceleration control upon receipt of the second operation instruction from the operation input device to decelerate the automatic driving vehicle, wherein the period of time from the completion of the second operation to the completion of the deceleration under the second deceleration control is longer than the period of time from the completion of the first operation to the completion of the deceleration under the first deceleration control.

In one embodiment of the automatic driving control system, the first deceleration control may be a control for decelerating the automatic driving vehicle during a period with the first operation being executed, in which the deceleration is completed immediately after the completion of the first operation.

In one embodiment of the automatic driving control system, the second deceleration control may be a control for decelerating the automatic driving vehicle to a speed that is not reached by a time immediately after the completion of the second operation.

In one embodiment of the automatic driving control system, the second deceleration control may be a control for applying deceleration while either a predetermined target vehicle speed or a target amount of change in the vehicle speed is set.

In one embodiment of the automatic driving control system, the first operation instruction and the second operation instruction may be applied in relation to a common portion of the operation input device, and the operation input device may determine an operation instruction being applied in relation to the common portion to receive the first operation instruction or the second operation instruction.

In one embodiment of the automatic driving control system, the common portion of the operation input device may be the same button provided on a touch panel.

In one embodiment of the automatic driving control system, the common portion of the operation input device may be the same button or lever, the first operation instruction may be a long press on the button or the lever, and the second operation instruction may be a short press on the button or the lever.

In one embodiment of the automatic driving control system, the automatic driving vehicle may run in the automatic driving mode after the completion of the first deceleration control.

In one embodiment of the automatic driving control system, the automatic driving vehicle may run in the automatic driving mode after the completion of the second deceleration control.

In one embodiment of the automatic driving control system, the automatic driving vehicle may further include an emergency stop operation input device for instructing that an emergency stop is made, and when the emergency stop operation input device is operated, emergency stop control may be executed prior to the first deceleration control and the second deceleration control.

According to another aspect disclosed in this disclosure, there is provided an automatic driving control system, including an operation input device to be manually operated by an operator while the automatic driving vehicle is running in an automatic driving mode, the operation input device being for receiving a first operation instruction or a second operation instruction; and a control device for executing a first acceleration control upon receipt of the first operation instruction from the operation input device to accelerate the automatic driving vehicle and for executing a second acceleration control upon receipt of the second operation instruction from the operation input device to accelerate the automatic driving vehicle, wherein the period of time from the completion of the second operation to the completion of the acceleration under the second acceleration control is longer than the period of time from the completion of the first operation to the completion of the acceleration under the first acceleration control.

For example, the first acceleration control may be a control for accelerating the automatic driving vehicle during a period with the first operation being executed, and completes the acceleration immediately after the completion of the first operation. In contrast, for example, the second acceleration control may be a control for accelerating the automatic driving vehicle to a speed not achieved by a time immediately after the completion of the second operation. Under the second acceleration control, acceleration may be applied while a predetermined target vehicle speed or a target amount of change in the vehicle speed is set.

For example, the automatic driving vehicle may run in the automatic driving mode after the completion of the first acceleration control. For example, the automatic driving vehicle may run in the automatic driving mode after the completion of the second acceleration control.

The operator can select either of the first deceleration control and the second deceleration control which are different from each other in the period of time from the completion of operation to the completion of deceleration, or either of the first acceleration control and the second acceleration control which are different from each other in the period of time from the completion of operation to the completion of acceleration, while the automatic driving vehicle is running in the automatic driving mode. This enables the automatic driving vehicle to run in a manner close to the intention of the operator.

BRIEF DESCRIPTION OF DRAWINGS

Embodiment(s) of the present disclosure will be described based on the following figures, wherein.

DESCRIPTION OF EMBODIMENTS

Figure 1:
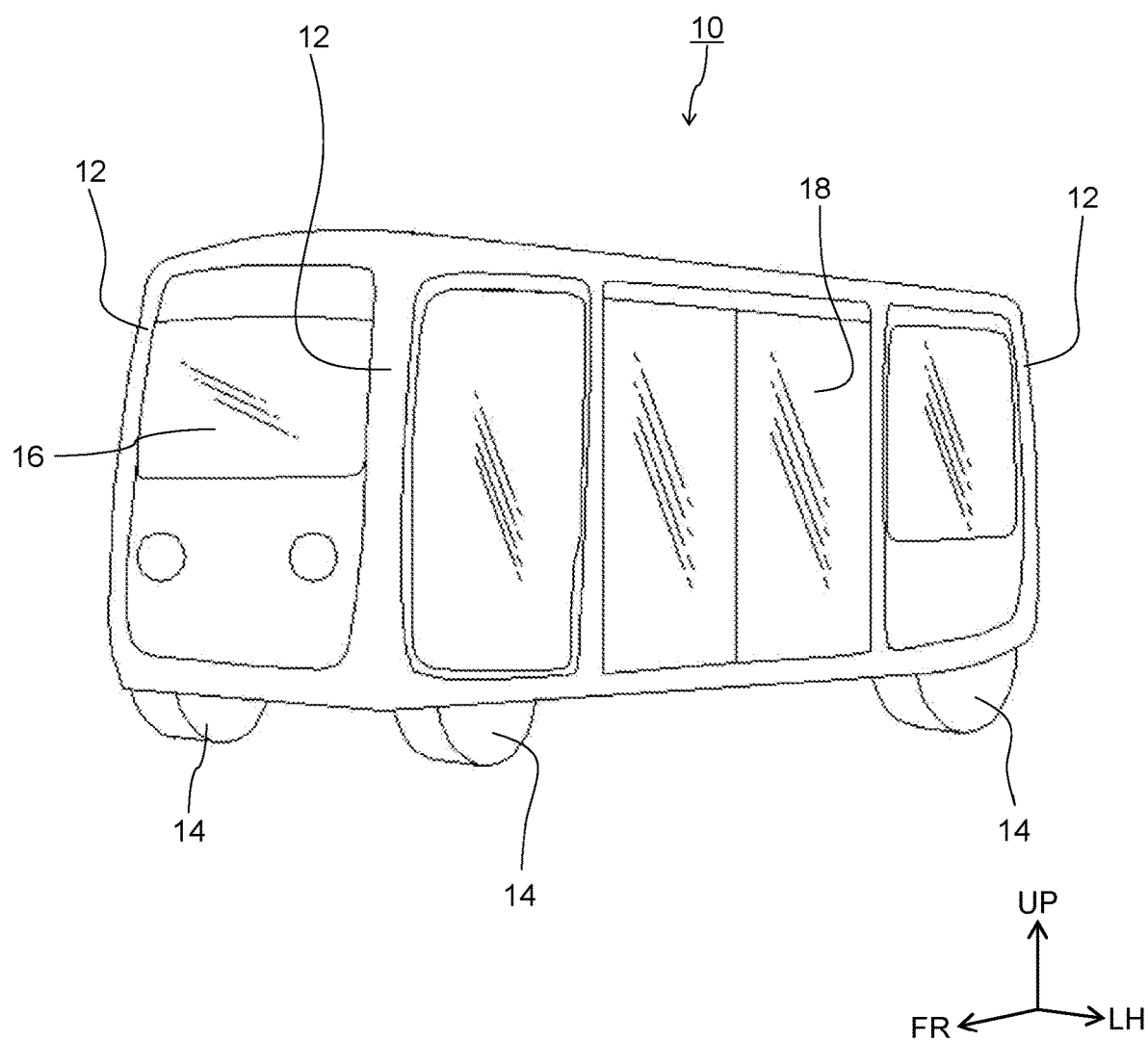
FIG. 1 illustrates the external appearance of an automatic driving vehicle according to an embodiment.

Embodiments will now be described referring to the drawings. Although a specific aspect will be described below to facilitate understanding of the embodiment, this is only for illustration of an example of an embodiment, and various other embodiments are possible.

FIG. 1 illustrates the external appearance of an automatic driving vehicle 10 according to the embodiment. In the respective drawings attached to this specification, terms "front (FR)" and "rear" mean front and rear, respectively, in the front-rear direction of a vehicle; terms "left (LH)" and "right" mean left and right, respectively, when facing forward; and terms "up (UP)" and "down" mean up and down, respectively, in the up-down direction of a vehicle.

The automatic driving vehicle 10 is shaped like a substantially rectangular parallelepiped that is front-rear symmetrical, and has an external design that is also front-rear symmetrical. The automatic driving vehicle 10 has pillars 12 disposed at the four respective corners in a plan view and extending in the up-down direction. Below each pillar 12, a wheel 14 is mounted. A large part of each of the front, rear, right, and left side walls of the automatic driving vehicle 10 is made from one or more semi-transparent panels 16. The panel 16 may be a display panel, where letters or the like may be displayed.

One or more panels constituting the left surface of the automatic driving vehicle 10 constitute a slidable door 18. The door 18 slides to open so that an occupant can get on or off the vehicle. An extendable ramp (not illustrated in FIG. 1) is stored below the door 18. The ramp is used, for example, for an occupant in a wheelchair to get on or off the vehicle.

The automatic driving vehicle 10 is a vehicle capable of automatic driving. Specifically, the automatic driving vehicle 10 can be driven in a plurality of driving modes, including an automatic driving mode and a manual driving mode. In this embodiment, the automatic driving mode includes a control mode for control by a management center and a control mode for control by the automatic driving vehicle 10.

The automatic driving mode is a driving mode in which driving control is executed mainly by a computer. In this specification, driving control is a concept encompassing gear shift control, vehicle speed control, and steering control. Vehicle speed control is a concept encompassing launch control, stop control, and acceleration/deceleration control of the automatic driving vehicle 10.

Of the automatic driving modes, the control mode for control by a management center is a mode in which driving control is executed by a computer mounted in the automatic driving vehicle 10 in response to an instruction from the management center. The management center is available to manage and control a plurality of automatic driving vehicles 10, and is constituted for communication with the respective automatic driving vehicles 10. In the control mode for control by the management center, the running route of the automatic driving vehicle 10 is determined in response to an instruction from the management center. Driving control by a computer mounted in the automatic driving vehicle 10 is largely executed in response to an instruction by the management center. In this embodiment, however, launch control for launching a vehicle in a stopped state is executed upon receipt of an instruction from the operator on board the automatic driving vehicle 10.

Of the automatic driving modes, the control mode for control by the automatic driving vehicle 10 is a driving mode in which, in principle, a majority of the driving control of the automatic driving vehicle 10 is executed based on a determination made by a computer mounted in the automatic driving vehicle 10 without receiving an instruction from outside. In the control mode for control by the automatic driving vehicle 10 in this embodiment, a computer in the automatic driving vehicle 10 executes driving control, based on the results of measurements by various sensors (for example, a camera, a lidar, or the like) mounted in the automatic driving vehicle 10 without receiving an instruction from the management center, so that the automatic driving vehicle 10 runs along a predetermined route. Only, launch control for launching the vehicle in a stopped state is executed upon receipt of an instruction from the operator on board the automatic driving vehicle 10.

The manual driving mode is a mode in which automatic driving of the automatic driving vehicle 10 is not executed, but the operator on board the automatic driving vehicle 10 executes driving control of the automatic driving vehicle 10.

An operator here refers to a person on board the automatic driving vehicle 10 and involved in control of the automatic driving vehicle 10. In the automatic driving mode, in which, mainly, the management center or the automatic driving vehicle 10 itself executes driving control, the operator has few occasions to execute driving control. Nevertheless, as the operator is involved in launch control for launching the vehicle in a stopped state, and retains control, for example, for deceleration control or the like, as will described later, the operator can be considered to be involved in control of the automatic driving vehicle 10. Meanwhile, in the manual driving mode, the operator serves as a driver who conducts a driving operation of the automatic driving vehicle 10 in person, and thus can be considered to be involved in control of the automatic driving vehicle 10.

The automatic driving vehicle 10 is a vehicle in which many unspecified occupants ride. In this embodiment, the automatic driving vehicle 10 is utilized as a bus that runs along a predetermined route within a specified site to transport passengers. Thus, the automatic driving vehicle 10 is expected to repeat stop and launch at a relatively high frequency. In addition, the automatic driving vehicle 10 is expected to run at a relatively slow speed (for example, slower than 30 km/h).

The configuration of use of the automatic driving vehicle 10 disclosed in this specification, however, can be changed arbitrarily. For example, the automatic driving vehicle 10 can be utilized as a mobile business space, a sales outlet that displays and sells various products, or an eating outlet that serves cooked foods and drinks. Alternatively, as another configuration, the automatic driving vehicle 10 can be used as an office where people do office work or have meetings with clients. Occasions in which the automatic driving vehicle 10 is utilized are not limited to business scenes, but the automatic driving vehicle 10 may be used, for example, as a private moving means. The running pattern and speed of the automatic driving vehicle 10 can be changed arbitrarily.

The automatic driving vehicle 10 is an electric vehicle including a drive motor as a motor, that receives electric power from a battery. The battery is a chargeable and dischargeable secondary battery, and is regularly charged with power from an outside source. The automatic driving vehicle 10, however, is not limited to an electric vehicle, and may be a vehicle of any other type. For example, the automatic driving vehicle 10 may be an engine vehicle having an engine as a motor, or a hybrid vehicle having an engine and a drive motor as a motor. Alternatively, the automatic driving vehicle 10 may be a hydrogen vehicle that drives a drive motor with electric power generated by a fuel cell.

Figure 2:
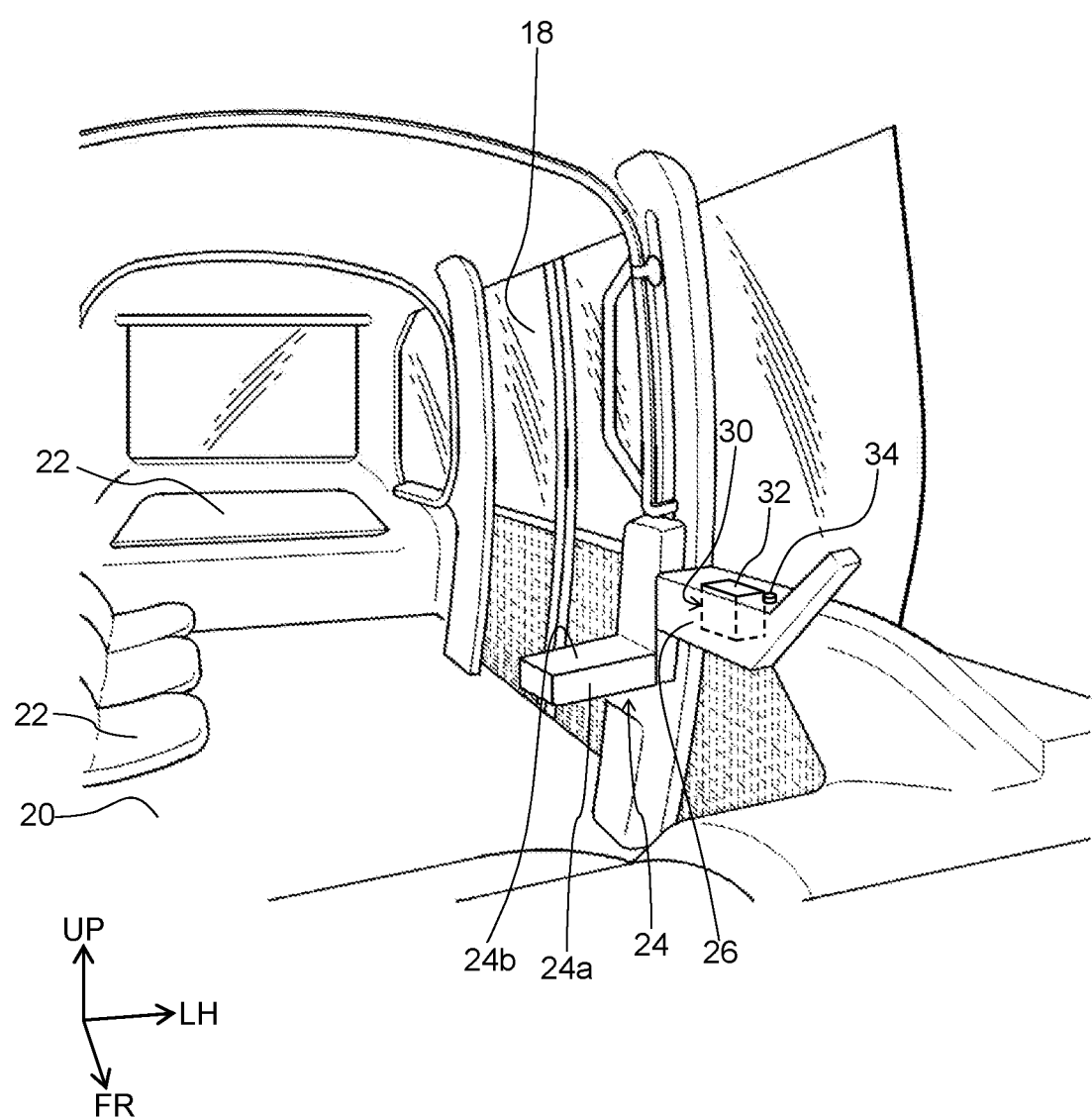
FIG. 2 is a first perspective view of a vehicle cabin of an automatic driving vehicle according to the embodiment.
Figure 3:
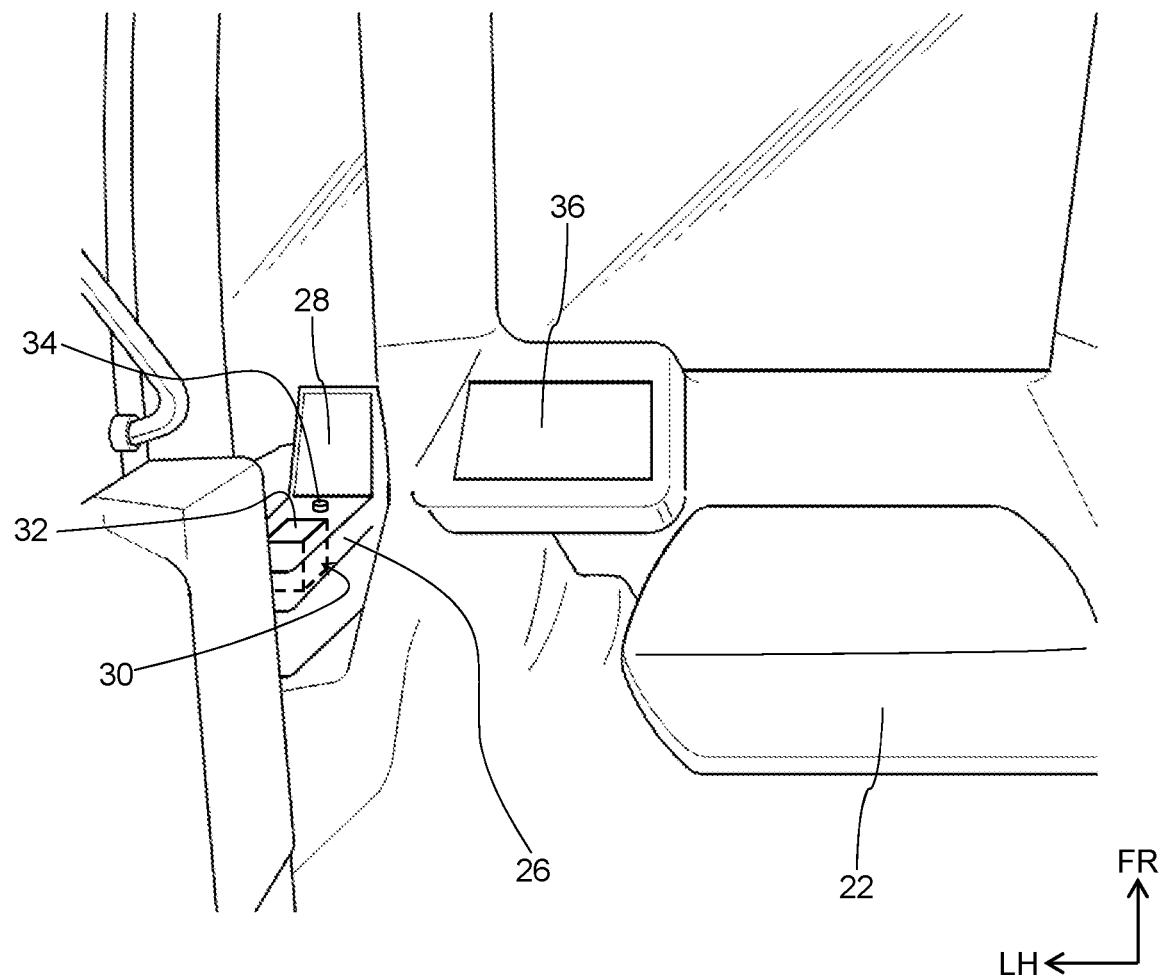
FIG. 3 is a second perspective view of a vehicle cabin of an automatic driving vehicle according to the embodiment.

FIG. 2 and FIG. 3 are perspective views of the interior of the cabin of the automatic driving vehicle 10. As the automatic driving vehicle 10 is used as a bus, as described above, an area in the middle of the cabin constitutes a floor 20 where occupants stand or where a wheelchair with an occupant sitting therein is placed. Along the side wall in the cabin, seats 22 for occupants are provided.

The automatic driving vehicle 10 includes an operator seat 24 for the operator who is responsible for driving control of the automatic driving vehicle 10 and operates various instruments (an air conditioner, a wiper, or the like) provided to the automatic driving vehicle 10. In FIG. 2, a seat portion 24a of the operator seat 24 is flipped down such that a seat bottom 24b is seen. The seat portion 24a can be flipped up. Although in this embodiment the operator seat 24 is provided on the left surface and forward of the door 18 in the cabin, the operator seat 24 may be provided on the right surface of the cabin.

Forward of the operator seat 24, there is provided an armrest 26 that extends in the front-rear direction for the operator sitting on the operator seat 24 to rest his/her arm thereon. As in this embodiment the operator seat 24 is provided on the left surface inside the cabin, as described above, the armrest 26 as well is disposed in the left end area in the cabin. If the operator seat 24 is provided on the right surface inside the cabin, the armrest 26 as well is disposed in the right end area in the cabin. The armrest 26 is provided at a position higher than the seat bottom 24b of the operator seat 24 that is in a condition that allows the operator to sit thereon, or a seating condition.

On the front end portion of the armrest 26, a touch panel 28 is provided standing upward from the upper surface of the armrest 26 (refer to FIG. 3). As the touch panel 28 is directed rearward (that is, toward the operator seat 24), the operator can operate the touch panel 28 with his/her finger while sitting on the operator seat 24 and resting his/her arm on the armrest 26. The touch panel 28 enables input of a vehicle speed control instruction in the automatic driving mode, and input of an instrument control instruction relative to instruments (a blinker, a horn, a headlight, an air conditioner, a wiper, or the like) mounted in the automatic driving vehicle 10. Details of the display screen of the touch panel 28 will be described later.

The armrest 26 includes a storage unit 30 for storing a mechanical operation unit for inputting a driving control instruction in relation to the automatic driving vehicle 10. The storage unit 30 is covered by a cap 32. That is, the mechanical operation unit is not exposed in the vehicle cabin when being stored in the storage unit 30. In this embodiment, the upper surface of the armrest 26 is flush with the cap 32. Although in this embodiment the storage unit 30 is provided to the armrest 26, the storage unit 30 may be provided to a place other than the armrest 26. In this case as well, the storage unit 30 is provided in an unfeatured place, for example, on the end portion of any of the front, rear, right, and left sides in the vehicle cabin. The mechanical operation unit is pulled out of the storage unit 30 mainly when the driving mode of the automatic driving vehicle 10 is the manual driving mode. When the driving mode of the automatic driving vehicle 10 is the automatic driving mode, the mechanical operation unit is normally stored in the storage unit 30 to prevent erroneous operation of the mechanical operation unit.

On the upper surface of the armrest 26, an emergency stop button 34 is provided. The emergency stop button 34 is a device for inputting an emergency stop operation in relation to the automatic driving vehicle 10. The emergency stop button 34 is a mechanical button for manually inputting an emergency stop instruction. A mechanical button here refers to an actual physical button, rather than a button to be displayed on the touch panel 28, or the like, according to a program. When the operator presses the emergency stop button 34, the emergency stop button 34 sends an electric signal to the driving control device.

The mechanical emergency stop button 34 is a device for receiving a press operation by the operator. As an emergency stop operation input device, for example, a mechanical lever or the like or a button (for receiving a press or touch operation by the operator) displayed on the touch panel 28 may be employed instead of the emergency stop button 34.

The automatic driving vehicle 10 includes only three operation input devices for inputting a vehicle speed control instruction for the automatic driving vehicle 10; namely, the touch panel 28, the mechanical operation unit, and the emergency stop button 34. That is, the automatic driving vehicle 10 does not include a foot pedal, such as an acceleration pedal or a brake pedal, like those provided in conventional automobiles, to be operated with a foot to input a vehicle speed control instruction.

A display 36 for displaying information on the automatic driving vehicle 10 is provided at the front left corner in the cabin (refer to FIG. 3). The display 36 displays information, such as, for example, the vehicle speed of the automatic driving vehicle 10, outside temperature, or the next bus stop. Similar to the touch panel 28, the display 36 as well is directed rearward such that the touch panel 28 and the display 36 appear aligned to each other to the operator sitting on the operator seat. This allows the operator to visually check both the touch panel 28 and the display 36. For example, the display 36 is provided at the same height as the touch panel 28. Specifically, the display 36 and the touch panel 28 are disposed such that the top end of the display 36 is positioned at the same height as that of the touch panel 28, the lower end of the display 36 is positioned at the same height as that of the touch panel 28, or the middle portion of the display 36 in the height direction is positioned at the same height as that of the touch panel 28.

Figure 4:
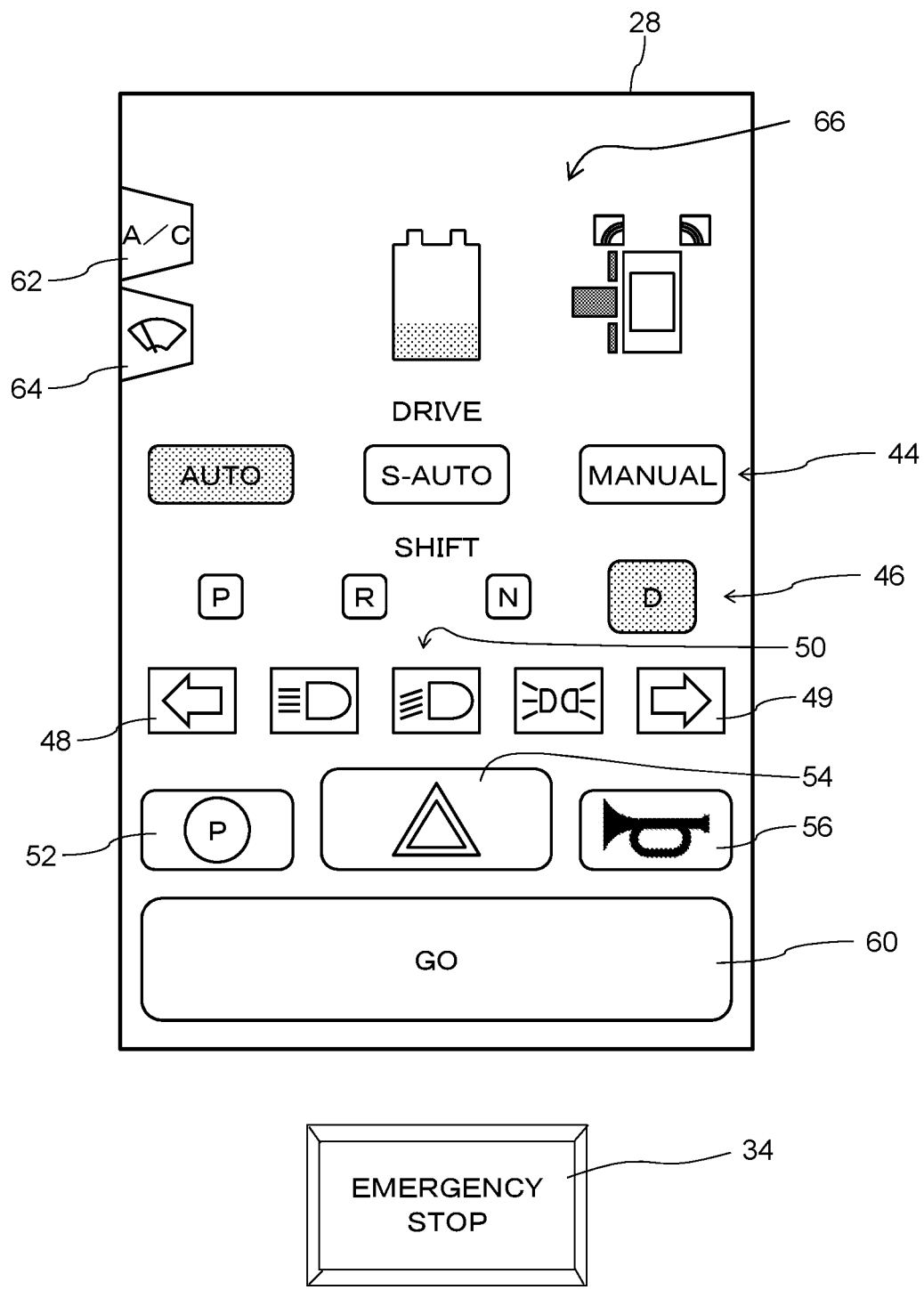
FIG. 4 illustrates a screen of a touch panel displayed with a vehicle stopped.
Figure 5:
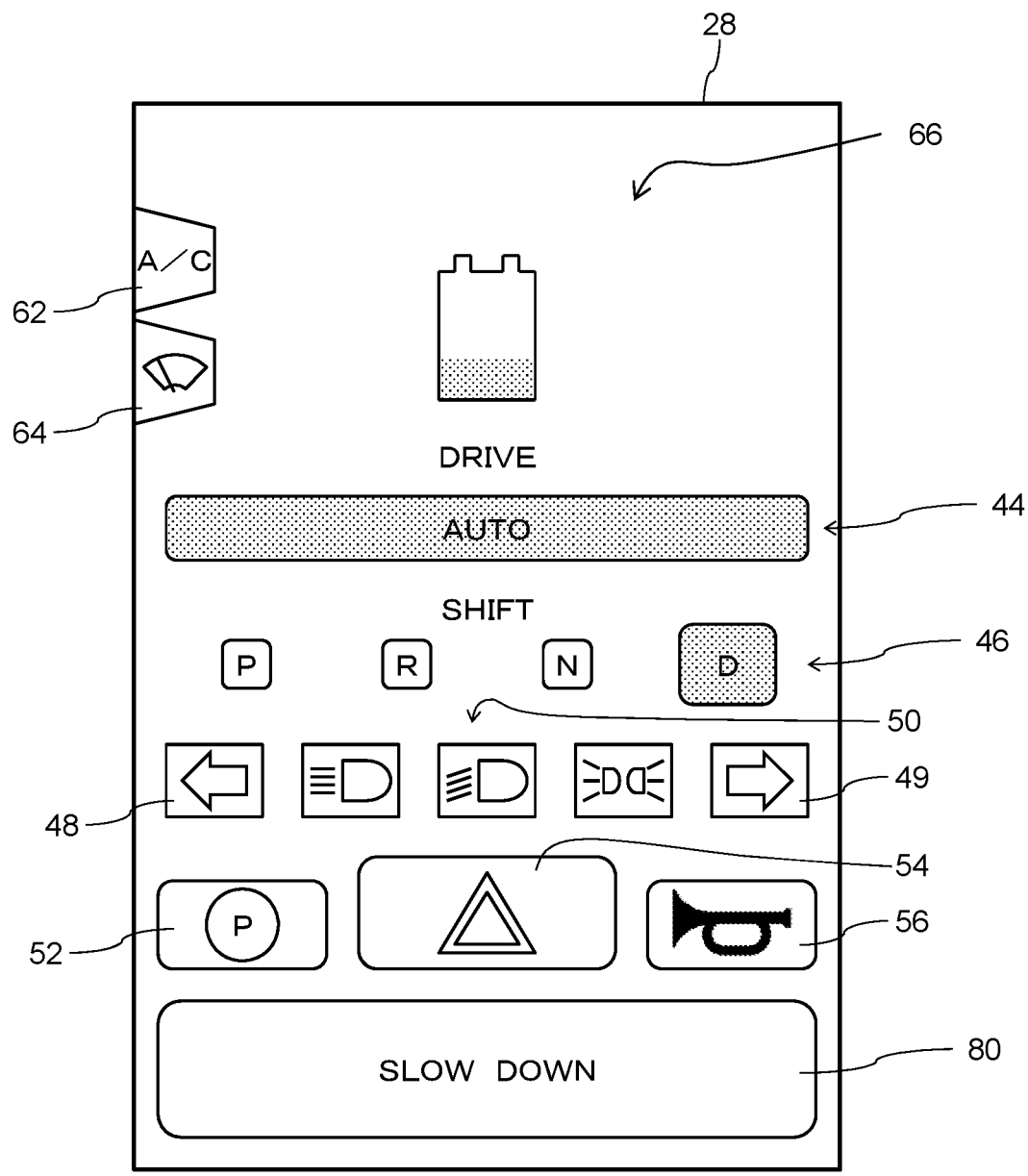
FIG. 5 illustrates a screen of a touch panel displayed with a vehicle in automatic running.
Figure 5:
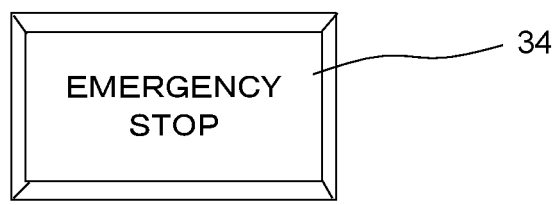

FIG. 4 and FIG. 5 illustrate a screen displayed on the touch panel 28 and the emergency stop button 34 provided below the touch panel 28. FIG. 4 illustrates a screen displayed when the automatic driving vehicle 10 is stopped in the automatic driving mode; FIG. 5 illustrates a screen displayed when the automatic driving vehicle 10 is running in the automatic driving mode.

Referring to FIG. 4, the touch panel 28 will be outlined. The touch panel 28 displays buttons as mentioned below; namely, a driving mode button 44 for inputting a driving mode change instruction, a shift button 46 for inputting a gear shift control instruction, blinker buttons 48, 49 for controlling blinkers, light buttons 50 for controlling a headlight and a taillight, a P brake button 52 for making an activation/release instruction in relation to an electric parking brake, a hazard warning lamp button 54 for causing a hazard warning lamp to operate, a horn button 56 for causing a horn to operate, a GO button 60 for making a launch instruction, an air conditioner tab 62 for controlling an air conditioner, and a wiper tab 64 for controlling a wiper. Of these, touching the air conditioner tab 62 triggers display of various buttons relevant to an air conditioner, and touching the wiper tab 64 triggers display of various buttons relevant to control of the wiper. On the upper portion 66 of the touch panel 28, the remaining amount of battery of the automatic driving vehicle 10, the open/close state of the door 18, the condition of the ramp, and measured states by the various sensors provided to the automatic driving vehicle 10 are displayed.

The driving mode button 44 is set operable only while the automatic driving vehicle 10 is stopped. In the example illustrated in FIG. 4, "AUTO", representing the automatic driving mode, is selected. In the automatic driving mode, an automatic driving control device controls running of the automatic driving vehicle 10. In contrast, in the manual driving mode, a manual driving control device controls running of the automatic driving vehicle 10. In this embodiment, the shift button 46 is set inoperable in the automatic driving mode so that the gears cannot be changed by means of an operation by the operator.

The GO button 60 is a button displayed on the touch panel 28 when the automatic driving vehicle 10 is stopped in the automatic driving mode. The GO button 60 is a button for inputting a launch instruction in relation to the automatic driving vehicle 10. That is, with the GO button 60 operated, the automatic driving vehicle 10 starts running (in the automatic driving mode in this case) under control by the automatic driving control device.

Referring to FIG. 5, the screen of the touch panel 28 displayed with the automatic driving vehicle 10 running in the automatic driving mode will be described. While the automatic driving vehicle 10 is running in the automatic driving mode, the touch panel 28 displays a SLOW DOWN button 80, instead of the GO button 60. The SLOW DOWN button 80 is a button for inputting a deceleration control instruction to the control device of the automatic driving vehicle 10. Assume here that the SLOW DOWN button 80 can receive a plurality of operations. That is, the SLOW DOWN button 80 corresponds to a common portion of the operation input device, to which a first operation and a second operation are both applied. As the first operation and the second operation are both applied to the common portion, a simpler layout of the touch panel 28 (namely, the disposition of the buttons on the user interface, or the like) is possible. The automatic driving control system includes a deceleration (acceleration for acceleration control) operation input device including the SLOW DOWN button 80 to be displayed on the touch panel 28, and an automatic driving control device or the like.

(1) First Embodiment

Based on the above-described assumption, a first embodiment will be described referring to FIG. 6 and FIG. 7. In the first embodiment, there will be described a case in which a long press is employed as an example of a first operation and a short press is employed as an example of a second operation. A long press refers to an operation of pressing the SLOW DOWN button 80 for a longer period of time than a set period of time $\Delta t$ (for example, one second). With a long press applied, the automatic driving vehicle 10 keeps deceleration while the SLOW DOWN button 80 is kept pressed (which is an example of a first deceleration control). Meanwhile, a short press refers to an operation of pressing the SLOW DOWN button 80 for a shorter period of time than the set period of time $\Delta t$. With a short press applied, the automatic driving vehicle 10 conducts a relatively large deceleration according to a setting (which is an example of a second deceleration control). That is, deceleration will automatically continue after the operator releases his/her finger from the SLOW DOWN button 80 until the automatic driving vehicle 10 reaches the speed set. Note that a "speed" mentioned in this specification refers to a scalar quantity, which does not take into consideration a running direction.

Figure 6:
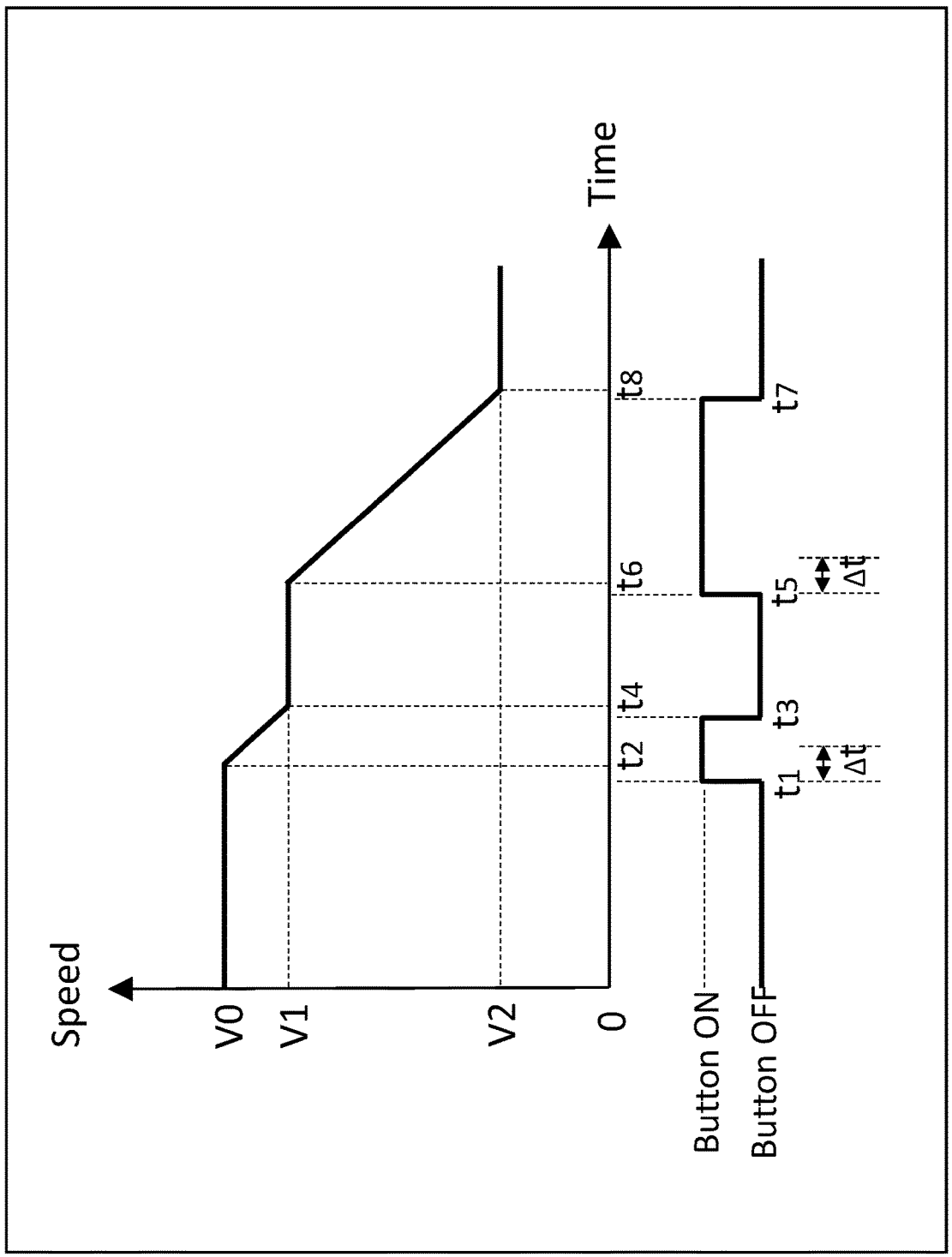
FIG. 6 illustrates an example of a change in speed with elapse of time in response to a long press.

FIG. 6 illustrates an example of the first operation and first deceleration control. In FIG. 6, assume that the operator keeps pressing the SLOW DOWN button 80 for a long period of time while the automatic driving vehicle 10 is running in the automatic driving mode. In FIG. 6, in which the X axis indicates time, a graph showing whether the SLOW DOWN button 80 is pressed (button ON) or not (button OFF) at each time point is shown in the lower part of the drawing, and a change in speed (Y axis) of the automatic driving vehicle 10 with elapse of time is shown in the upper part of the drawing.

In the example illustrated in FIG. 6, the automatic driving vehicle 10 starts running at the speed V0. At time t1, the operator starts pressing the SLOW DOWN button 80. At time t2 (for example, after 0.1 second after time t1), or a time immediately after the SLOW DOWN button 80 is pressed, the automatic driving vehicle 10 starts deceleration. As the operator keeps pressing the SLOW DOWN button 80 after the start of deceleration, it is considered, at the time when the set period of time Δt has elapsed after time t1 as a start point, that a long press has been applied. Thus, the automatic driving vehicle 10 continues deceleration while the SLOW DOWN button 80 is kept pressed.

At time t3, the operator completes the press operation on the SLOW DOWN button 80. At time t4, or a time immediately after the completion, the deceleration is completed. The period of time from time t3 to time t4 (the period of time from the completion of the first operation to the completion of the deceleration under the first deceleration control will be referred to as a "first period of time") is set as short as about 0.1 second. The automatic driving vehicle 10 has decelerated to the speed V1 by time t4 and thereafter continues running at the speed V1.

At subsequent time t5, the operator starts pressing the SLOW DOWN button 80 again. At immediately subsequent time t6, the automatic driving vehicle 10 starts deceleration. At the time by when the press operation has lasted more than the set period of time Δt, it is determined that a long press has been applied. The press operation is completed at time t7, and the deceleration is completed at immediately subsequent time t8 (corresponding to the first period of time). The automatic driving vehicle 10 runs at the decelerated speed V2 at time t8 and thereafter.

Figure 7:
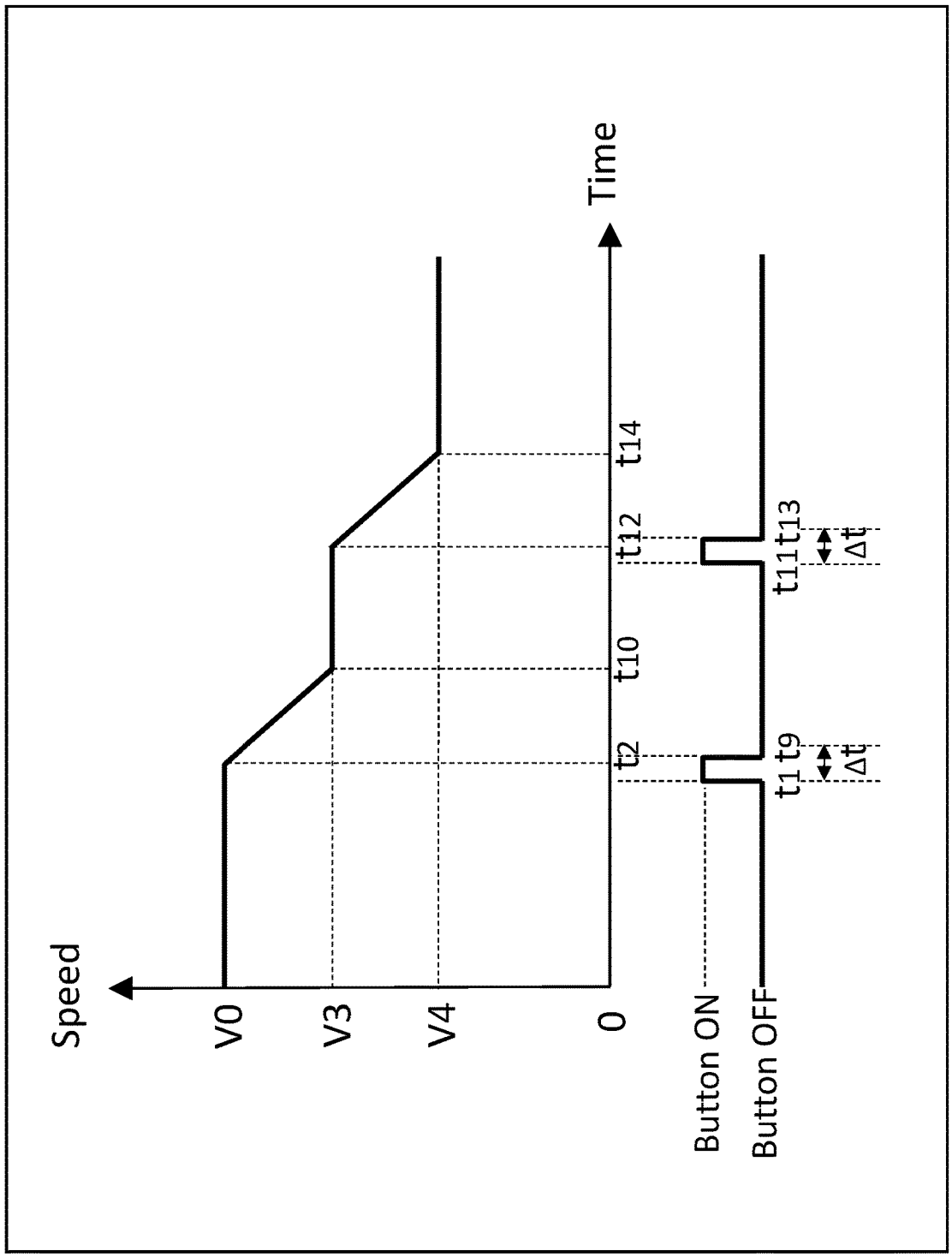
FIG. 7 illustrate an example of a change in speed with elapse of time in response to a short press.

FIG. 7 illustrates an example of the second operation and second deceleration control. In FIG. 7, assume that the operator applies a short press to the SLOW DOWN button 80 while the automatic driving vehicle 10 is running in the automatic driving mode. In the example illustrated in FIG. 7, the automatic driving vehicle 10 is initially running at the speed V0. At time t1, the operator starts pressing the SLOW DOWN button 80. At time t2, or a time immediately after the time at which the SLOW DOWN button 80 is pressed (for example, after 0.1 second after time t1), the automatic driving vehicle 10 starts deceleration. The procedure up to this point is the same as that of the example illustrated in FIG. 6.

In the example illustrated in FIG. 7, the operator completes the press operation on the SLOW DOWN button 80 at time t9 after the start of deceleration. At time t9, however, as the set period of time Δt has yet to elapse from time t1, it is determined that a short press has been applied to the SLOW DOWN button 80. Then, the automatic driving vehicle 10 applies control such that the initial speed V0 is decelerated to the speed V3 by the amount ΔV (for example, 5 km/h, 10 km/h, or the like). Since the speed V3 is discrete from the speed at time t9, and is set to a value not reachable within a short period of time, the automatic driving vehicle 10 reaches the speed V3 after the elapse of a relatively long period of time after time t9; namely, at time t10, (the period of time such as the period of time from time t9 to time t10, or from the completion of the second operation to the completion of the deceleration under second deceleration control, will be referred to as a "second period of time"). After the completion of the deceleration at time t10, the automatic driving vehicle 10 continues running at the speed V3.

At time t11, the press operation on the SLOW DOWN button 80 is resumed. At immediately subsequent time t12, the automatic driving vehicle 10 starts deceleration. Here again, as the operator completes the press operation at time t13, or a time before elapse of the period of time Δt after time t11, rather than applying a long press to the SLOW DOWN button 80, the automatic driving vehicle 10 applies control such that the speed V3 is decelerated to the speed V4 by the amount ΔV. Then, having reached the speed V4 at time t14 (the period of time from time t13 to time t14 also corresponds to the second period of time), the automatic driving vehicle 10 continues running at a constant speed.

As described above, a case in which a long press is applied to the SLOW DOWN button 80 is distinguished from a case in which a short press is applied to the SLOW DOWN button 80 to execute different deceleration control. This can increase the number of deceleration aspects available for the operator to select. With a long press completed, deceleration is completed immediately after the completion of the long press (that is, after the elapse of the first period of time, which is short). Here, "immediately after" refers to being short enough to realize that deceleration continues only while the first operation is being executed. In contrast, with a short press completed, deceleration continues over the second period of time, which is relatively long, to reach a slower speed.

In the example illustrated in FIG. 7, the speed is assumed to be decelerated by the amount ΔV in response to a single short press. Then, control is executed for deceleration while keeping the rate of deceleration (the amount of change in speed with elapse of time, which corresponds to a time differential value of the speed) constant. Alternatively, the setting and control for deceleration can be set in various different manners from the above without limitation. For example, the target speed which the speed finally reaches may be set based on the ratio relative to the initial speed (for example, deceleration by 20% for every application of deceleration) or through explicit designation of the target speed. One example of setting an explicit target speed includes an aspect in which, for example, the speed is decelerated to 15 km/h when the vehicle is running at a speed of 20 km/h or faster, and the vehicle is stopped when the vehicle is running at a speed of 20 km/h or slower. Alternatively, instead of a target speed, a target decelerated speed and a deceleration period of time, or a target torque (also referred to as a braking force) and a deceleration period or the like, may be designated, so that the speed is resultantly decelerated to a certain speed.

Also in the process of deceleration toward the target speed, an aspect in which a target decelerated speed is set to apply deceleration and an aspect in which a target torque is set to apply deceleration are available. Further, a target period of time until completion of deceleration may be set to apply deceleration such that (the torque due to) the braking force through braking is controlled through feedback control while gradually changing the target speed so that the target speed can be attained within the target period of time.

In the above description, an aspect in which deceleration is completed immediately after the completion of a long press operation, or the first operation, is described as the first deceleration control. Alternatively, the first deceleration control may be executed in any other control aspect, provided that the first period of time from the completion of the first operation to the completion of deceleration is shorter than the second period of time. As one example, an aspect is available in which the first deceleration control involves a smaller amount of deceleration than that under the second deceleration control; for example, the first deceleration control is for deceleration by 5 km/h, while the second deceleration control is for deceleration by 10 km/h.

In the first embodiment, the operator can designate either the first deceleration control or the second deceleration control while the automatic driving vehicle 10 is running in the automatic driving mode. Accordingly, the operator can control the automatic driving vehicle 10 such that the automatic driving vehicle 10 runs as he/she intends.

(2) Second Embodiment

Figure 8:
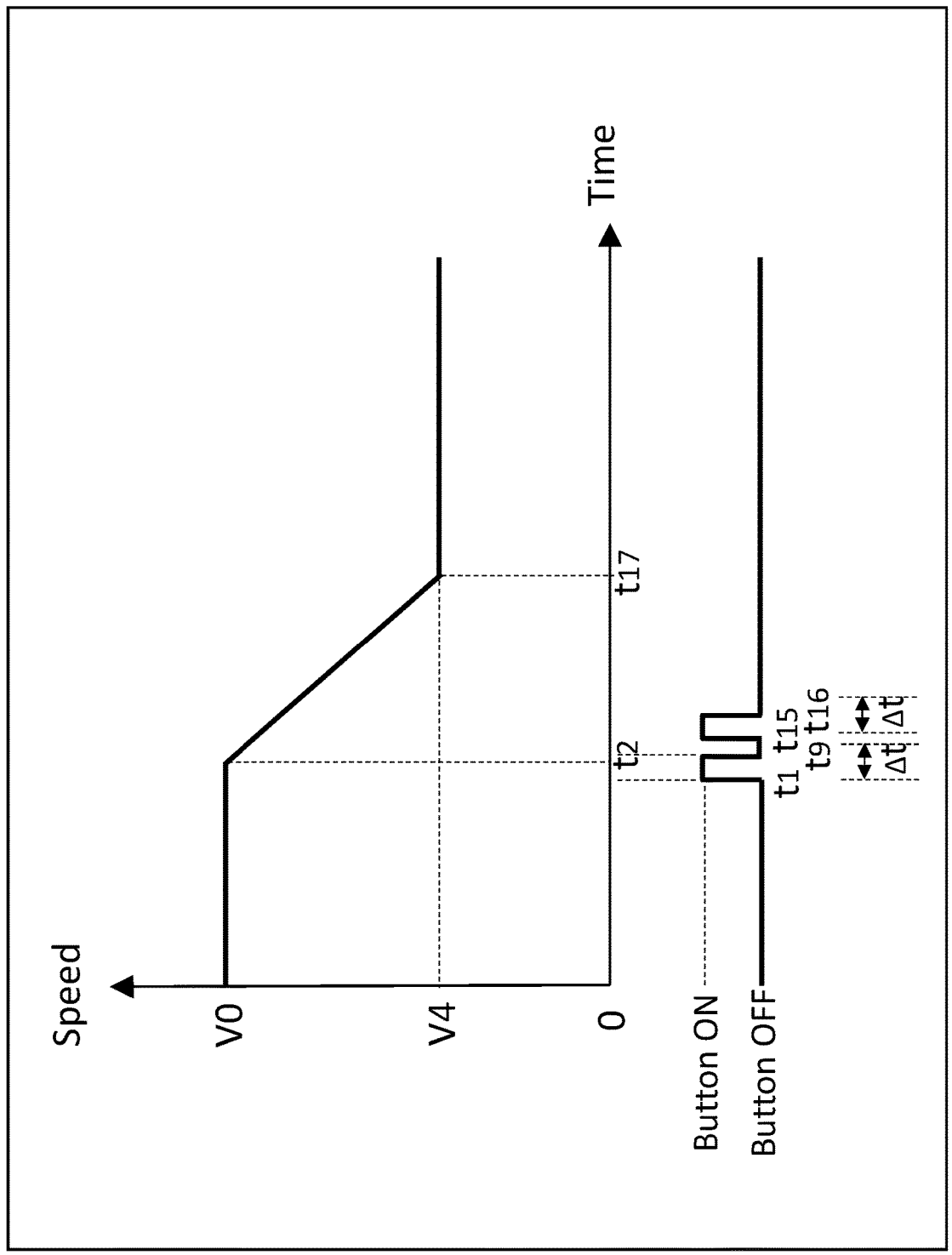
FIG. 8 illustrates an example of a change in speed with elapse of time in response to two successive short presses.

Referring to FIG. 8, a second embodiment will be described. The second embodiment is an embodiment relevant to a second operation and second deceleration control. Specifically, different from the first embodiment, an example in which a short press is repetitively applied will be described.

Similar to FIG. 7, FIG. 8 illustrates a case in which the SLOW DOWN button 80 is pressed for a short period. Similar to FIG. 7, the operator applies a short press from time t1 to time t9. In the example in FIG. 8, however, different from the example in FIG. 7, a short press operation is executed again promptly after time t9 from time t15 to time t16. In the automatic driving vehicle 10, deceleration control for deceleration to the speed V4, or the speed decelerated from the initial speed V0 by the amount of 2ΔV, is executed. As the deceleration range is large, a long period of time is necessary for the speed to reach the speed V4 at time t17 after time t16, at which the press operation is completed (the period of time from time t16 to time t17 corresponds to the second period of time).

In the case in which the SLOW DOWN button 80 is repetitively operated, as described above, deceleration control is executed through accumulation of operations. Specifically, in the example illustrated in FIG. 8, setting can be effected such that deceleration is made by a larger amount in accordance with the number of times of repetitions of a short press.

Alternatively, in the case where the SLOW DOWN button 80 is repetitively pressed, control may be conducted such that only the last operation is considered effective. That is, in the case where only the last operation is considered effective, the speed in the example in FIG. 8 is decelerated by only the amount ΔV from the speed at time t15 before completing the deceleration. If the press operation from t15 is a long press in the example in FIG. 8, deceleration is completed immediately after the completion of the long press.

(3) Third Embodiment

Figure 9:
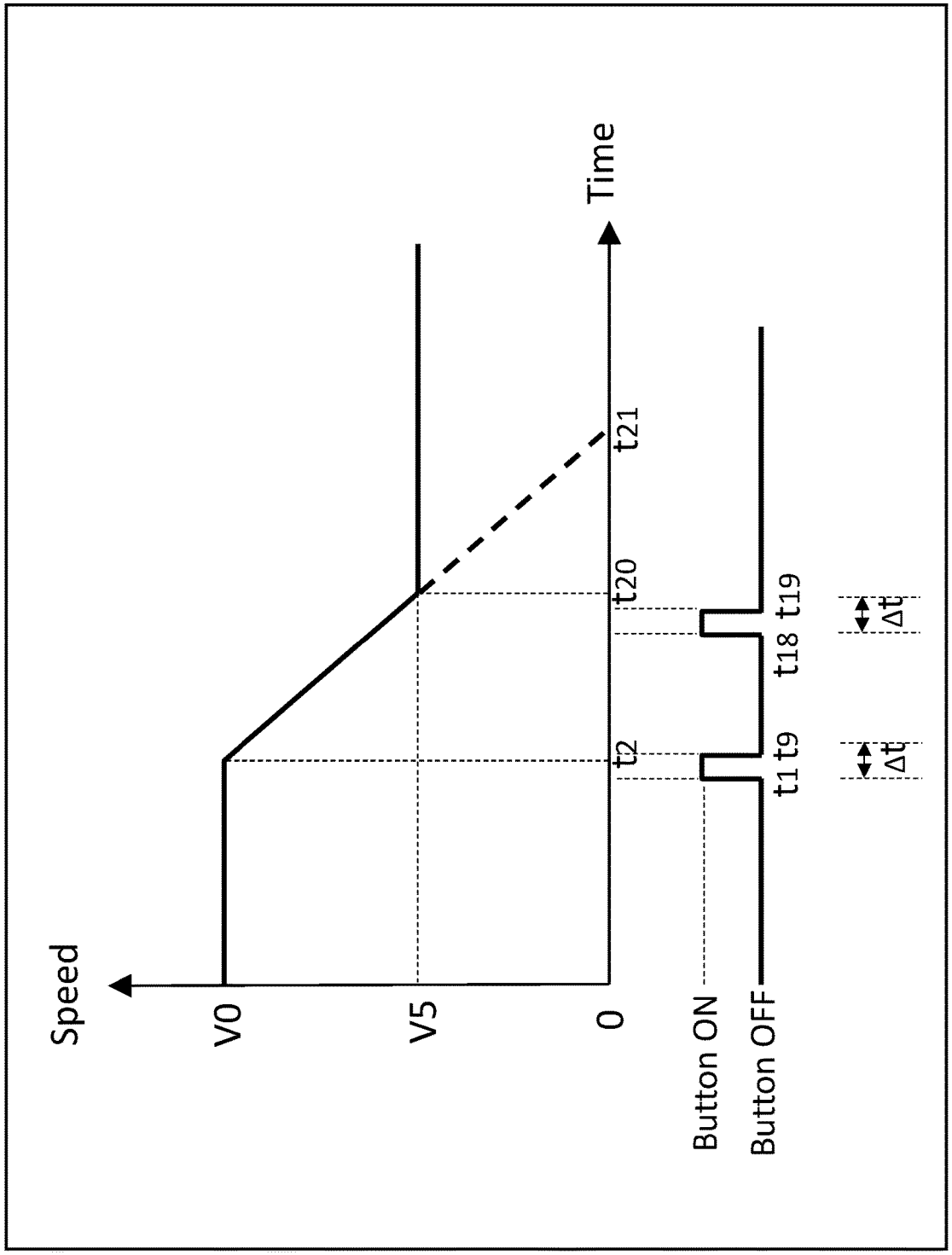
FIG. 9 illustrates an example of a change with elapse of time when a deceleration end instruction is issued during deceleration.

Referring to FIG. 9, a third embodiment will be described. The third embodiment is an embodiment relevant to a second operation and second deceleration control. In the third embodiment, it is assumed that the automatic driving vehicle 10 stops in response to a short press on the SLOW DOWN button 80.

In the example illustrated in FIG. 9, similar to the case illustrated in FIG. 7, the SLOW DOWN button 80 is pressed for a short period from time t1 to time t9. Thereupon, the automatic driving vehicle 10, which is running initially at the speed V0, starts deceleration at time t2. Unless any special operation is thereafter applied, the automatic driving vehicle 10 continues deceleration until the speed becomes zero at time t21, at which the automatic driving vehicle 10 stops, whereby the deceleration control is completed. With the automatic driving vehicle 10 stopped, the touch panel 28 displays the GO button 60 again, instead of the SLOW DOWN button 80, as illustrated in FIG. 4.

FIG. 9 illustrates a case in which the SLOW DOWN button 80 is pressed again for a short period from time t18 to time t19 during deceleration. At time t20, immediately after the completion of the short press, the automatic driving vehicle 10 completes the deceleration and thereafter continues running while keeping the speed V5, or the speed at time t20. Allowing suspension of deceleration, as described above, can increase the number of options available for the operator to select for deceleration control.

In the above description, it is assumed that deceleration initiated in response to a short press on the SLOW DOWN button 80 continues until the automatic driving vehicle 10 stops. Alternatively, deceleration initiated in response to a short press on the SLOW DOWN button 80 may automatically stop when the speed reaches the lowest speed set.

(4) Fourth Embodiment

Referring to FIG. 10A to FIG. 10C and FIG. 11, a fourth embodiment will be described. The fourth embodiment is an example in which not only a deceleration operation but also an acceleration operation is applicable.

The first to third embodiments describe deceleration control of the automatic driving vehicle 10. If acceleration is applicable after deceleration initiated in response to pressing the SLOW DOWN button 80, it could enhance the convenience for a vehicle in running.

In the case where only one of the two set levels is selectable as a running speed and deceleration and acceleration are applied between these two levels, the configuration of the buttons to be displayed on the touch panel 28 can be simple. For example, in the case where the SLOW DOWN button 80 illustrated in FIG. 5 is pressed, displaying a "SPEED UP button" in the same size as that of the SLOW DOWN button 80 at the same position as where the SLOW DOWN button 80 is displayed, instead of the SLOW DOWN button 80, enables a subsequent input of an acceleration operation. In a configuration that allows selection of the running speed from among three or more levels, however, such a display that presents options of both acceleration and deceleration seems reasonable.

Figure 10A:
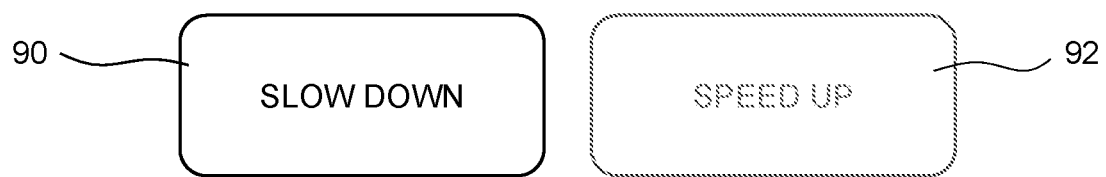
FIG. 10A illustrates an example of display of a SLOW DOWN button and a SPEED UP button.
Figure 10B:
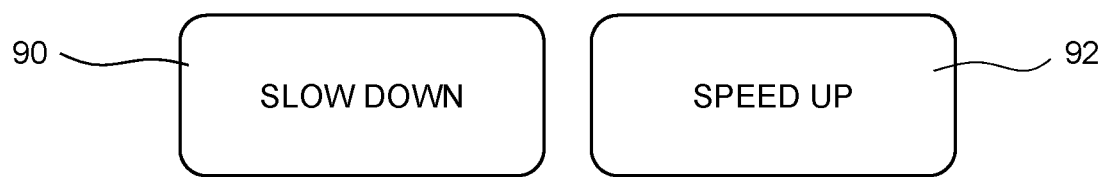
FIG. 10B illustrates an example of display of a SLOW DOWN button and a SPEED UP button.
Figure 10C:
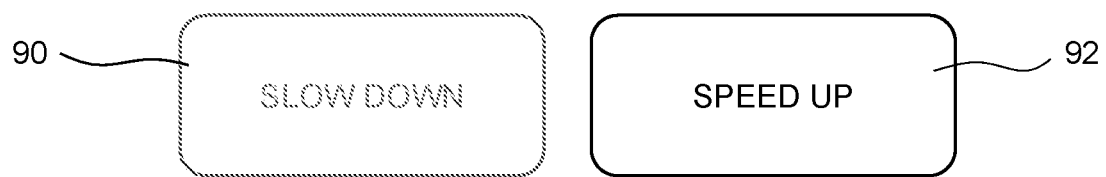
FIG. 10C illustrates an example of display of a SLOW DOWN button and a SPEED UP button.

FIG. 10A to FIG. 10C illustrate two adjacent buttons to be displayed instead of the SLOW DOWN button 80 on the touch panel 28 illustrated in FIG. 5. Specifically, a SLOW DOWN button 90 is disposed on the left side, while a SPEED UP button 92 is disposed on the right side.

FIG. 10A illustrates an example of an image displayed with the automatic driving vehicle 10 running at the highest speed with no deceleration instruction issued (for example, before time t1 in FIG. 6). Although the SLOW DOWN button 90 is explicitly displayed and thus operable, the SPEED UP button 92 is displayed dimly (or not displayed) and thus is inoperable. In the example in FIG. 6, before time t1 it is possible only to issue an instruction for deceleration by pressing the SLOW DOWN button 90, but not for acceleration by pressing the SPEED UP button 92.

FIG. 10B illustrates an image displayed in a situation where further deceleration is possible after the current deceleration (for example, at time t1 and thereafter in FIG. 6). In this situation, both the SLOW DOWN button 90 and the SPEED UP button 92 are explicitly displayed and thus operable. Hence, the operator can issue instructions for both deceleration and acceleration.

FIG. 10C illustrates a situation where the automatic driving vehicle 10 is running at the lowest set speed, and thus no further deceleration is applicable. In this situation, while the SLOW DOWN button 90 is displayed dimly (or may not be displayed) and thus inoperable, the SPEED UP button 92 is explicitly displayed and thus operable. Hence, the operator can issue an instruction for acceleration, but not for deceleration.

As described above, both the first operation and the second operation, including a long press and a short press, are applicable to the SLOW DOWN button 90 illustrated in FIG. 10A and FIG. 10B. Similarly, the SPEED UP button 92 illustrated in FIG. 10B and FIG. 10C can be set so as to receive two operations, including a long press and a short press. That is, in response to one operation, acceleration control is completed after the elapse of a relatively short period of time after the completion of the operation, and in response to the other operation, acceleration control is completed after the elapse of a relatively long period of time after the completion of the operation.

Figure 11:
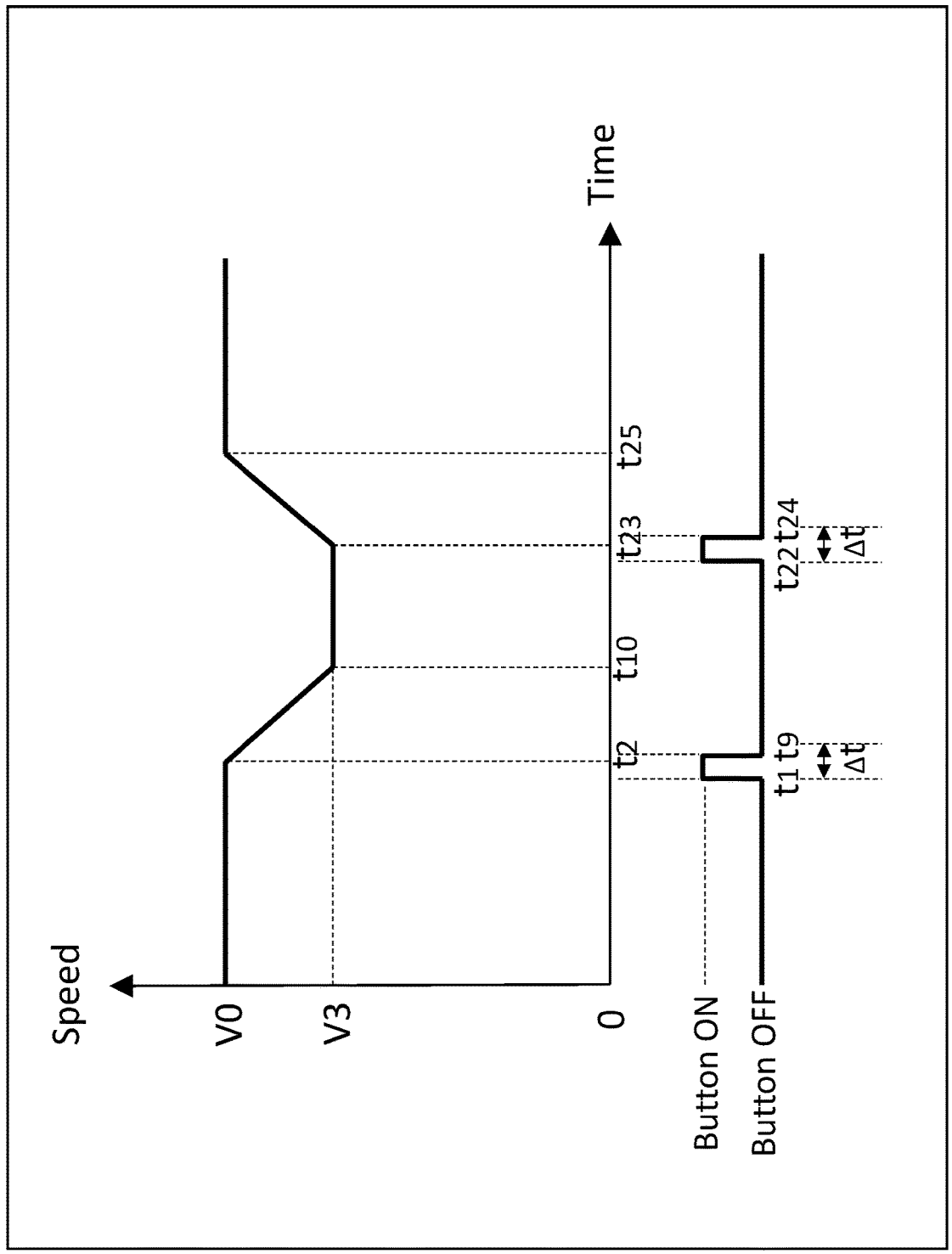
FIG. 11 illustrates an example of a change in speed with elapse of time when acceleration is applied in response to a short press.

Subsequently, referring to FIG. 11, a specific example in which acceleration is applied after deceleration will be described. In FIG. 11, the SLOW DOWN button 90 illustrated in FIG. 10A is assumed to be pressed for a short period at time t1. Accordingly, similar to the example illustrated in FIG. 7, the speed decreases from the speed V0 to the speed V3 from time t2 to time t10. At time t1 and thereafter or at time t2 or thereafter, the touch panel 28 displays both the SLOW DOWN button 90 and the SPEED UP button 92, illustrated in FIG. 10B, in an operable state. At time t22, a press operation on the SPEED UP button 92 starts, upon which the automatic driving vehicle 10 starts acceleration immediately after time t23. The operator completes the press operation at time t24. As the period of time from time t22 to time t24 is shorter than the set period of time Δt, this press operation is determined as a short press. Hence, control for acceleration from the speed V3 to the speed V0 by an amount ΔV is applied, so that the automatic driving vehicle 10 reaches the speed V0 at time t25 and thereafter continues running at the speed V0.

In the case where the SPEED UP button 92 is pressed at time t22 and then kept pressed for a period of time longer than the set period of time Δt in the example illustrated in FIG. 11, it is determined that a long press operation has been applied. Then, control is applied such that acceleration is completed immediately after the completion of the long press. As described above, an operation and control for deceleration is applicable to an operation and control for acceleration, and this is not limited to the technique described in the fourth embodiment, but is applied to those described in the first to third embodiments and the fifth and sixth embodiments. A person skilled in the art can understand that the operation and control for deceleration described in this specification is applicable to an operation and control for acceleration, and vice versa.

(5) Fifth Embodiment

Figure 12:
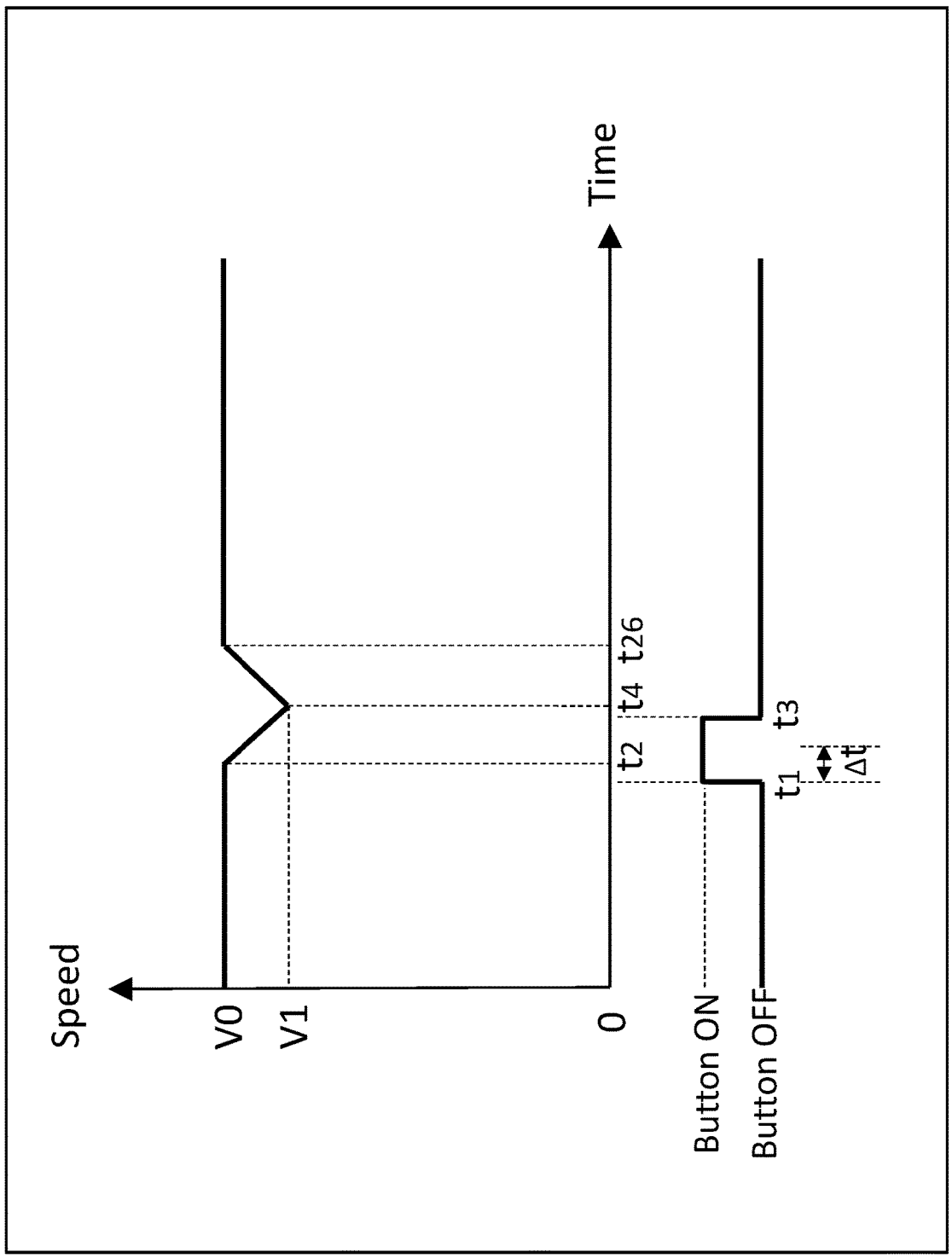
FIG. 12 illustrates an example of a change in speed with elapse of time when automatic acceleration is applied after the completion of deceleration.

Referring to FIG. 12, a fifth embodiment will be described. The fifth embodiment is relevant to an aspect in which a vehicle is accelerated without pressing the SPEED UP button 92.

In the example illustrated in FIG. 12, similar to the example illustrated in FIG. 6, the SLOW DOWN button 80 is pressed for a long period from time t1 to time t3, and the speed decreases to the speed V1 by time t4. At time t4 and thereafter, acceleration control is automatically applied, so that the automatic driving vehicle 10 reaches the highest speed V0 at time t26 and thereafter continues running at the speed V0.

FIG. 12 illustrates an example in which the automatic driving vehicle 10 automatically accelerates to the speed from which deceleration initiated in response to a long press has started, after completion of the deceleration. Similarly, the decelerated speed may be automatically increased to the speed from which deceleration initiated in response to a short press has started, after completion of the deceleration. In either case, in the fifth embodiment, as explicit designation of acceleration is unnecessary, the only requirement is to display the SLOW DOWN button 80, illustrated in FIG. 5, while the automatic driving vehicle 10 is running. This enables simpler display and operation.

In the above-described first to fifth embodiments, the first operation is a long press, and the second operation is a short press. In the case where the first and second operations are applied to the same SLOW DOWN button 80, 90, various other aspects are available provided that the operator can distinctively apply the first and second respective operations, and the first and second respective operations can be distinguished from each other on the side of the SLOW DOWN button 80, 90. As one example, there is available an aspect in which the first operation is a light press and the second operation is a deep press. Here, a light press refers to an operation of pressing the SLOW DOWN button 80, 90 with a weaker pressure than a pressure at a predetermined value or in a smaller area than an area defined by a predetermined value. Meanwhile, a deep press is an operation of pressing the SLOW DOWN button 80, 90 with a stronger pressure than a pressure at a predetermined value or in a larger area than an area defined by a predetermined value.

In the above description, the first and second operations are distinguished from each other based on a difference in operational aspect of the SLOW DOWN button 80, 90 on the touch panel 28. Alternatively, two buttons may be provided to the touch panel 28 so that one is used as a button for receiving the first operation and the other as a button for receiving the second operation. With two buttons provided, distinction between operations relative to the respective two buttons is unnecessary. In the case where two or more buttons are provided to the touch panel 28, these buttons may be displayed, for example, in different colors to facilitate visual recognition by the operator.

In a configuration where the operator operates the touch panel 28, the content of an operation or control may be notified to the operator through display to enhance anticipation of the control relative to the operation. For example, in the case where the first and second operations are distinguished from each other based on whether a long press or a short press is applied, it will be convenient if the shift from a short press to a long press is recognizable at the time of shifting from the short press to the long press. In view of the above, the shift can be notified by means of a message "shifted to long press" or change in color of the button. Alternatively, a result of deceleration control, such as "release finger stops deceleration" or the like, may be notified through display. Alternatively, as the second period of time from the completion of an operation to the completion of deceleration in the second operation is long, an aspect in which the target speed to be reached through acceleration or deceleration is displayed, such as "will decelerate to 20 km/h", or an aspect in which the magnitude of acceleration/deceleration is displayed, such as "will decrease by 10 km/h", is possible.

A mechanical operation input device, such as a physical button or a lever, may be provided instead of the touch panel 28. A button may include a pressing button or a rotatable dial button.

The same button or lever can be used to receive both the first operation and the second operation. In this case, similar to the case of the touch panel 28, distinction between the first and second operations can be made, for example, based on whether a long press (or deep leaning in the case of a lever) or a short press (or slight leaning in the case of a lever) is applied.

Alternatively, the first operation and the second operation may be assigned to respective different buttons or levers. Alternatively, a button or a lever can be used for the first operation, while the button on the touch panel 28 can be used for the second operation (or vice versa).

In the above description, the operator can execute two operations; namely, the first operation and the second operation. Alternatively, the operator can execute three or more operations. For example, a third operation to be newly employed to ensure three operations is distinguishable from the first and second operations. The period of time from the completion of a third operation to the completion of deceleration may be set longer than the respective first and second periods of time.

(6) Sixth Embodiment

Figure 13:
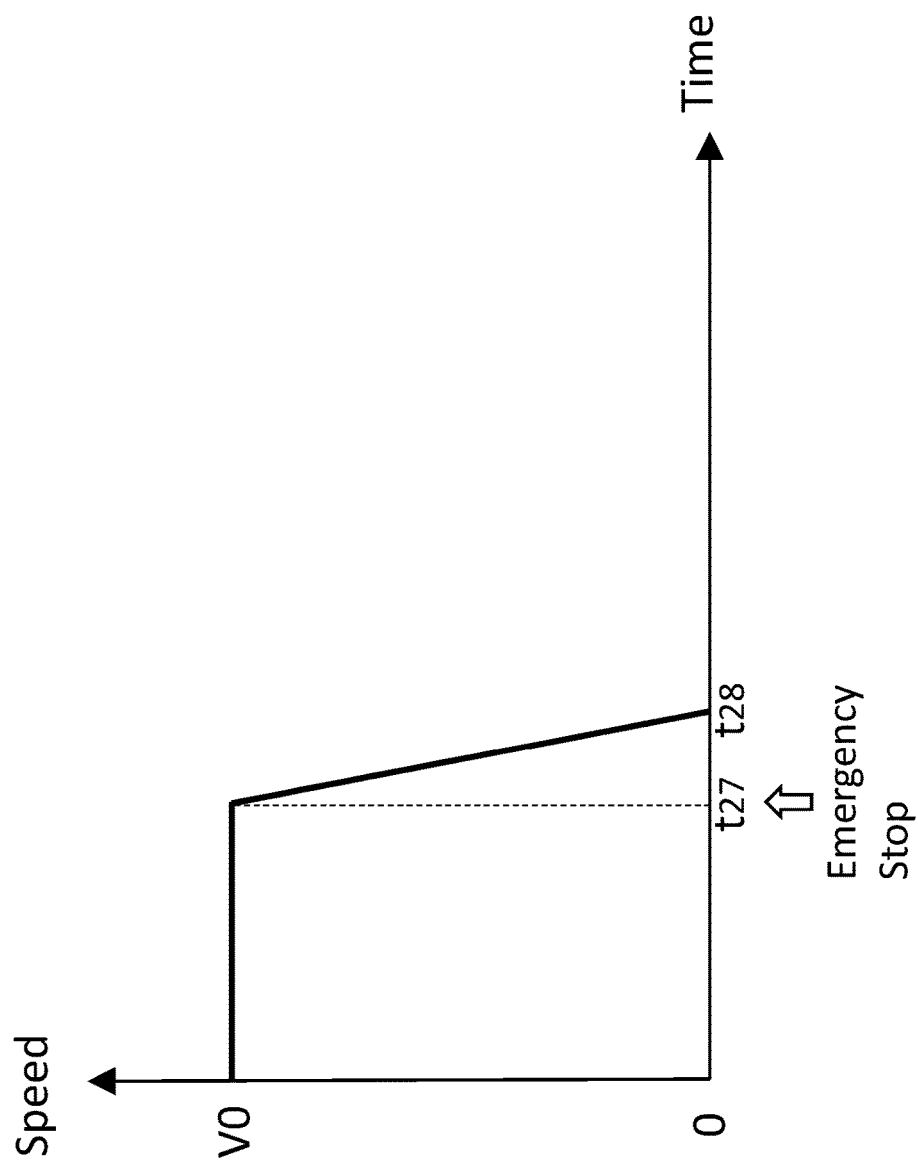
FIG. 13 schematically illustrates a change in speed with elapse of time when an emergency stop button is operated.

Referring to FIG. 13, a sixth embodiment will be described. The sixth embodiment describes an example in which the operator presses the emergency stop button 34 while the automatic driving vehicle 10 is running in the automatic driving mode. The emergency stop button 34 is an emergency stop operation input device for instructing the automatic driving vehicle 10 to stop for emergency, as described above. The emergency stop button 34 is pressed when the operator feels it dangerous to continue running while watching the situation around the automatic driving vehicle 10.

FIG. 13 schematically illustrates a change in speed with elapse of time when the emergency stop button 34 is pressed. The X axis indicates time, and the Y axis indicates speed. In FIG. 13, the operator is assumed to press the emergency stop button 34 at time t27 while the automatic driving vehicle 10 is running at the speed V0. Then, the automatic driving vehicle 10 starts remarkable deceleration within a short period of time at immediately after time t27. As is obvious from comparison with FIG. 6, deceleration for an emergency stop is larger than normal deceleration, and the vehicle decreases the speed sharply. Then, at time t28, the speed becomes zero, and the automatic driving vehicle 10 stops, whereby the deceleration control is completed.

With the automatic driving vehicle 10 stopped, the GO button 60 is displayed instead of the SLOW DOWN button 80, as illustrated in FIG. 4. When the emergency stop button 34 is pressed, emergency stop control is executed prior to control for acceleration, deceleration, or stop via the SLOW DOWN button 80, 90, the SPEED UP button 92, or the like.

In the first to sixth embodiments, running control in the automatic driving mode is assumed to continue throughout the whole period. That is, it is assumed that the automatic driving vehicle 10 runs in the automatic driving mode throughout a period including a period with acceleration/deceleration applied, a period with the automatic driving vehicle 10 stopped through deceleration, or a period with the automatic driving vehicle 10 running slowly after completion of acceleration/deceleration, and that the automatic driving control device executes driving control. Thus, although the operator issues an instruction for acceleration, deceleration, or stop of the automatic driving vehicle 10 in the automatic driving mode, the operator is not involved in either actual speed control, including determination of the degree of acceleration or deceleration, or steering. Moreover, instructions other than an instruction for acceleration/deceleration are all made under control by the automatic driving control device. Thus, the operator does not need to drive the automatic driving vehicle 10 in person after issuing a deceleration instruction.

Alternatively, the manual driving control device, separately provided from the automatic driving control device, can execute acceleration/deceleration control. That is, when the automatic driving control device is made to execute control again after completion of acceleration/deceleration, it is possible to continue running in the automatic driving mode. Alternatively, there is available an aspect, for example, in which the automatic driving mode is switched to the manual driving mode after start or completion of acceleration/deceleration so that the automatic driving vehicle 10 thereafter continues manual driving.

The above description is based on an assumption that the operator is on board the automatic driving vehicle 10, and the automatic driving control system is mounted in the automatic driving vehicle 10. Alternatively, the operator can operate the automatic driving vehicle 10 through remote operation from the management center or the like. With remote operation, the automatic driving control system may be mounted in the automatic driving vehicle 10 or in a remote place, such as the management center or the like.

REFERENCE SIGNS LIST 10 automatic driving vehicle,
12 pillar,
14 wheel,
16 panel,
18 door,
20 floor,
22 seat,
24 operator seat,
24a seat portion,
24b seat bottom,
26 armrest,
28 touch panel,
30 storage unit,
32 cap,
34 emergency stop button,
36 display, 44 driving mode button,
46 shift button,
48 blinker button,
50 light button,
52 P brake button,
54 hazard warning lamp button,
56 horn button,
60 GO button,
62 air conditioner tab,
64 wiper tab,
66 upper portion,
80, 90 SLOW DOWN button,
92 SPEED UP button.

The invention claimed is:

1. An automatic driving control system, comprising:
an operation input device to be manually operated by an operator while an automatic driving vehicle is running in an automatic driving mode, the operation input device being for receiving a first operation or a second operation; and
a control device for executing a first deceleration control upon receipt of the first operation by the operation input device to decelerate the automatic driving vehicle and for executing a second deceleration control upon receipt of the second operation by the operation input device to decelerate the automatic driving vehicle,
wherein
a period of time from completion of the second operation to completion of deceleration under the second deceleration control is longer than a period of time from completion of the first operation to completion of deceleration under the first deceleration control.

2. The automatic driving control system according to claim 1, wherein the first deceleration control is a control for decelerating the automatic driving vehicle during a period with the first operation being executed, in which deceleration is completed immediately after the completion of the first operation.

3. The automatic driving control system according to claim 1, wherein the second deceleration control is a control for decelerating the automatic driving vehicle to a speed that is not reached by a time immediately after the completion of the second operation.

4. The automatic driving control system according to claim 3, wherein the second deceleration control is a control for applying deceleration while either a predetermined target vehicle speed or a target amount of change in a vehicle speed is set.

5. The automatic driving control system according to claim 1, wherein
the first operation and the second operation are applied relative to a common portion of the operation input device, and
the operation input device determines an operation being applied relative to the common portion to receive the first operation or the second operation.

6. The automatic driving control system according to claim 5, wherein the common portion of the operation input device is a single button provided to a touch panel.

7. The automatic driving control system according to claim 5, wherein
the common portion of the operation input device is a single button or lever,
the first operation is a long press on the button or the lever, and
the second operation is a short press on the button or the lever.

8. The automatic driving control system according to claim 1, wherein the automatic driving vehicle runs in the automatic driving mode after completion of the first deceleration control.

9. The automatic driving control system according to claim 1, wherein the automatic driving vehicle runs in the automatic driving mode after completion of the second deceleration control.

10. The automatic driving control system according to claim 1, wherein the automatic driving vehicle further includes an emergency stop operation input device for instructing that an emergency stop is made, and
when the emergency stop operation input device is operated, emergency stop control is executed prior to the first deceleration control and the second deceleration control.

11. An automatic driving control system, comprising:
an operation input device to be manually operated by an operator while an automatic driving vehicle is running in an automatic driving mode, the operation input device being for receiving a first operation or a second operation; and
a control device for executing a first acceleration control upon receipt of the first operation by the operation input device to accelerate the automatic driving vehicle and for executing a second acceleration control upon receipt of the second operation by the operation input device to accelerate the automatic driving vehicle,
wherein
a period of time from completion of the second operation to completion of acceleration under the second acceleration control is longer than a period of time from completion of the first operation to completion of acceleration under the first acceleration control.

* * * * *